Figure 1:
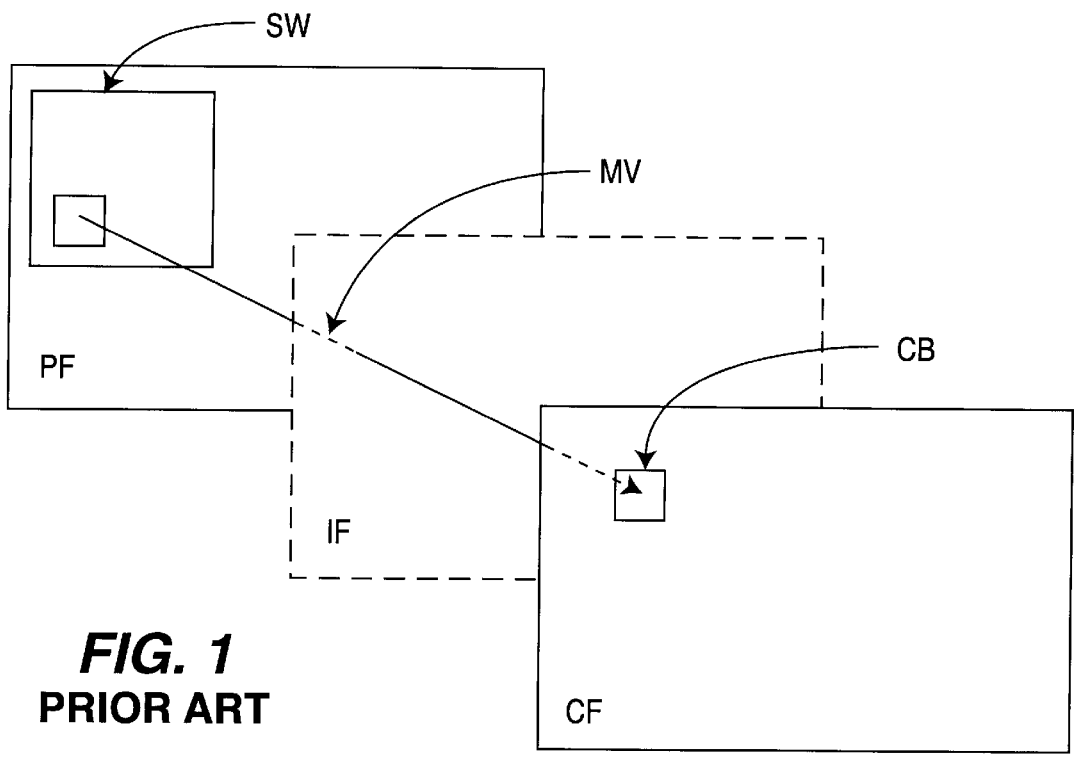

United States Patent
Knee et al.

[11] Patent Number: 5,822,007
[45] Date of Patent: *Oct. 13, 1998

[54] METHOD AND APPARATUS FOR MOTION ESTIMATION USING BLOCK MATCHING

[75] Inventors: Michael Knee, Hants, England; Andrew Hackett, Klingenthai, France; Michael Kerdranvat, Bischoffsheim, France; Nadine Bolender, Strasbourg, France

[73] Assignee: Thomson multimedia S.A., Courbevoie, France

[*] Notice: This patent issued on a continued prosecution application filed under 37 CFR 1.53(d), and is subject to the twenty year patent term provisions of 35 U.S.C. 154(a)(2).

[21] Appl. No.: 591,597

[22] PCT Filed: Aug. 30, 1994

[86] PCT No.: PCT/EP94/02870

§ 371 Date: Feb. 9, 1996

§ 102(e) Date: Feb. 9, 1996

[87] PCT Pub. No.: WO95/07591

PCT Pub. Date: Mar. 16, 1995

[30] Foreign Application Priority Data

Sep. 8, 1993 [DE] Germany ............................ 93402187.4
Nov. 2, 1993 [DE] Germany ............................ 93117674.7

[51] Int. Cl.⁶ .................................................. H04N 7/12
[52] U.S. Cl. ............................................. 348/416; 348/699
[58] Field of Search ................................. 348/416, 402, 348/413, 420, 422, 699, 441, 443, 458, 459; H04N 7/12

[56] References Cited

U.S. PATENT DOCUMENTS

| | | | |
|---|---|---|---|
| 5,012,337 | 4/1991 | Gillard | 348/416 |
| 5,089,887 | 2/1992 | Robert et al. | 348/699 |
| 5,162,907 | 11/1992 | Keating et al. | 358/105 |
| 5,398,079 | 3/1995 | Liu et al. | 348/699 |
| 5,410,358 | 4/1995 | Shackleton et al. | 348/459 |
| 5,469,226 | 11/1995 | David et al. | 348/699 |
| 5,526,053 | 6/1996 | Dorricott et al. | 348/443 |

*Primary Examiner*—Tommy P. Chin
*Assistant Examiner*—Y. Lee
*Attorney, Agent, or Firm*—Joseph S. Tripoli; Frederick A. Wein

[57] ABSTRACT

Block matching is well known as a robust and intuitively simple method of motion estimation for television pictures. However, when the purpose of the motion estimation is to provide accurate interpolation between images, conventional block matching suffers from the problem that the blocks are situated in the original fields rather than in the fields to be interpolated, leading to possible errors in the calculated motion field. The invention uses two-sided block matching. The search window is shared between the two input fields so that the candidate motion vectors related to be candidate pixel blocks all pass through the same points in the field to be interpolated. Thus, the "current block" becomes a notional area in the field to be interpolated, and each of the two search windows extends to half the maximum motion vector in each direction. Each motion vector points forward to the forward field by half its value and backward to the backward field by half its value. Two-sided block matching solves the positional error problem because the current blocks cover the interpolated field and are correctly placed in the interpolated field, and it solves the problem of gaps and conflicts because every point in the interpolated field has one motion vector assigned to it.

7 Claims, 5 Drawing Sheets

METHOD AND APPARATUS FOR MOTION ESTIMATION USING BLOCK MATCHING

The present invention relates to a method and to an apparatus for motion estimation using block matching.

BACKGROUND

Block matching is well known as a robust and intuitively simple method of motion estimation for television pictures.

Figure 7:
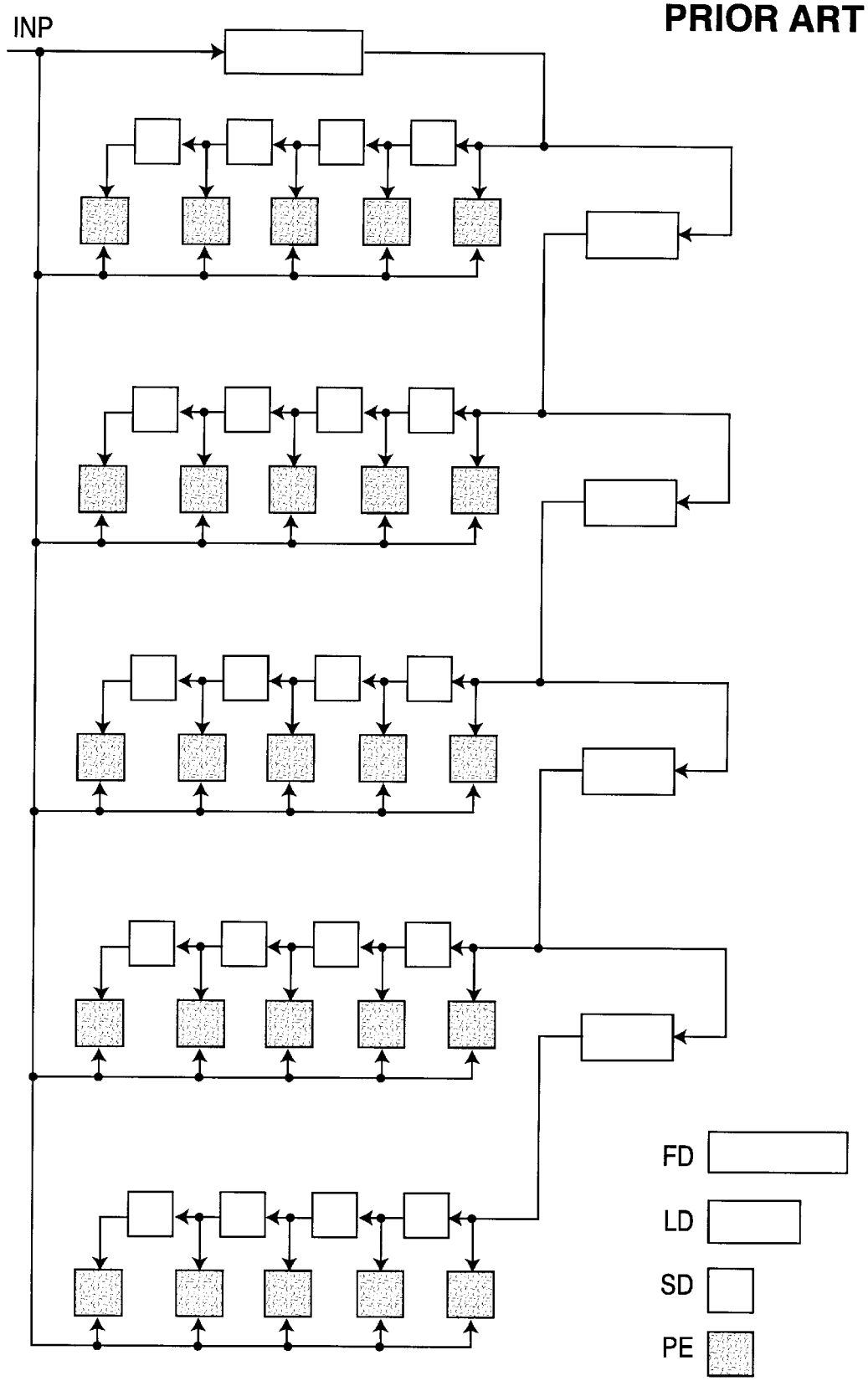

FIG. 7 shows a possible architecture for a one-sided block matching motion estimator with a range of ±2 pixels per field horizontally and vertically, to integer accuracy. This architecture is based on processing elements, one per candidate motion vector. Each processing element PE accumulates the errors between the pixels (which form a group related to a candidate block position and vector, respectively) arriving at its two inputs, storing partial results in order to arrive at a total error for each block. The processing elements are connected together by means not shown in the figure in order to find which one yields the minimum error for each block. The processing elements may calculate the minimum absolute value or the minimum squared error.

In the one-sided motion estimator in FIG. 7, all the processing elements PE have a common input INP, corresponding to the current block. The relative displacements between the pixels in the search window are provided by a network of line LD and sample SD delays that follow the field delay FD connected to input INP.

U.S. Pat. No. 5,162,907 shows one-sided block matching, in which the reference picture is not the picture to be interpolated. However, when the purpose of the motion estimation is to provide accurate interpolation between images, for example in a 50 Hz to 100 Hz upconverter, conventional block matching suffers from the problem that the blocks are situated in the original fields rather than in the fields to be interpolated, leading to possible errors in the calculated motion field.

SUMMARY

It is one object of the invention to disclose a method of block matching, which overcomes this problem.

It is a further object of the invention to disclose an apparatus which utilizes the inventive method.

The invention uses two-sided block matching. The advantages of two-sided block matching are not confined to 50 Hz to 100 Hz upconversion but apply to any temporal interpolation, for example 50 Hz to 60 Hz or 50 Hz to 75 Hz standards conversion, for which motion vectors are required at points in time between input fields.

In a conventional, or 'one-sided', block matching, one possible architecture in FIG. 1, the current field (or frame) CF of the picture is divided into blocks, typically rectangular. For each current block CB, a search is made among overlapping blocks of the same size in the previous field (or frame) PF to find one that matches the current-field block CB best, usually using a mean-square or mean-absolute error criterion summed across the pixels in the block. The relative position of the best-matching block in the previous frame gives the chosen displacement, or motion, vector MV for the current block. For a given current block CB, the set of pixels involved in the previous frame is known as the search window SW corresponding to that block. Thus, the block matching process makes use of the current block and the search window.

The problem with one-sided block matching, when applied to field rate upconversion, is that the blocks for which motion vectors are sought lie in the input fields rather than in the fields IF to be interpolated. This leads to a positional error PE (with respect to the position PCB of the current block) in FIG. 2 in the information used to estimate the motion vector, which increases with the speed of motion. This error becomes more important when block matching is applied to localizing. the boundaries between moving areas, as described in EP93 402188 of the applicant.

Figure 3:
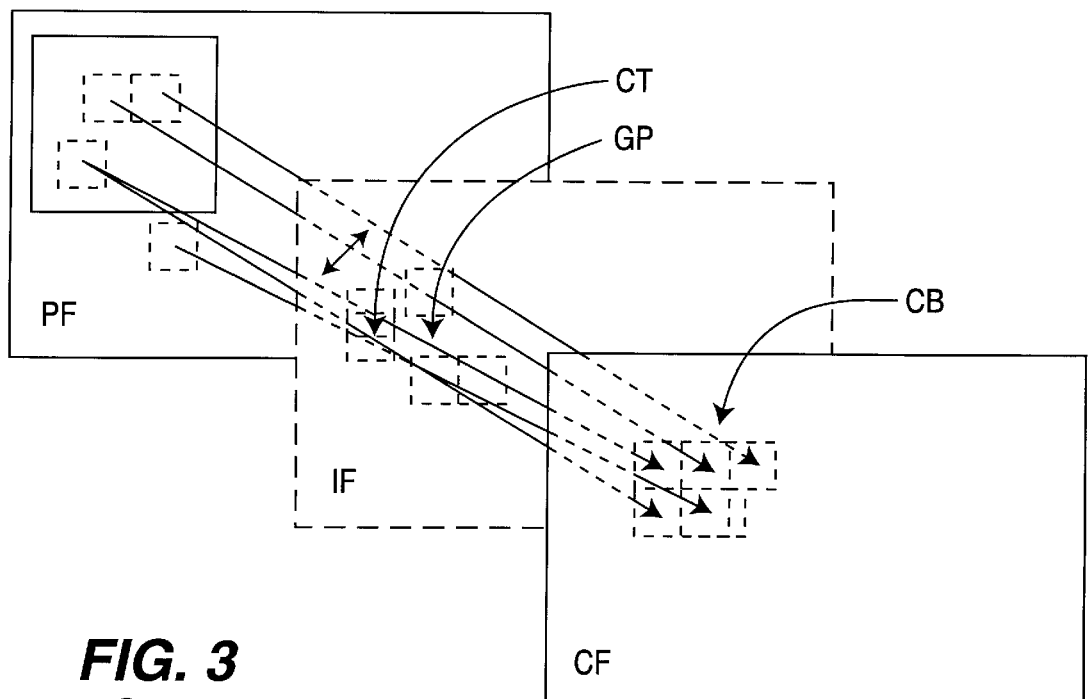

The positional error PE can be corrected by displacing the block in the interpolated field IF appropriately according to the motion vectors, but this leads to the occurrence of gaps GP (areas in the interpolated field for which no motion vectors exist) and, equally, of areas CT for which two or more motion vectors conflict, as shown in FIG. 3.

The inventive solution to the above problem is to use two-sided block matching which is explained with reference to FIG. 4. Here, the search window (BSW and FSW) is shared between the two input fields BF and FF in such a way that the candidate motion vectors (related to the candidate pixel blocks CPBB and CPBF) all pass through the same points in the field IF to be interpolated. Thus, the 'current block' becomes a notional area in the field to be interpolated, and each of the two new search windows BSW and FSW extends to half the maximum motion vector in each direction. Each motion vector points forward (forward half of motion vector FHMV) to the forward field FF by half its value and backward (backward half of motion vector BHMV) to the backward field BF by half its value. Both vector parts depend on the same candidate motion vector.

Figure 5:
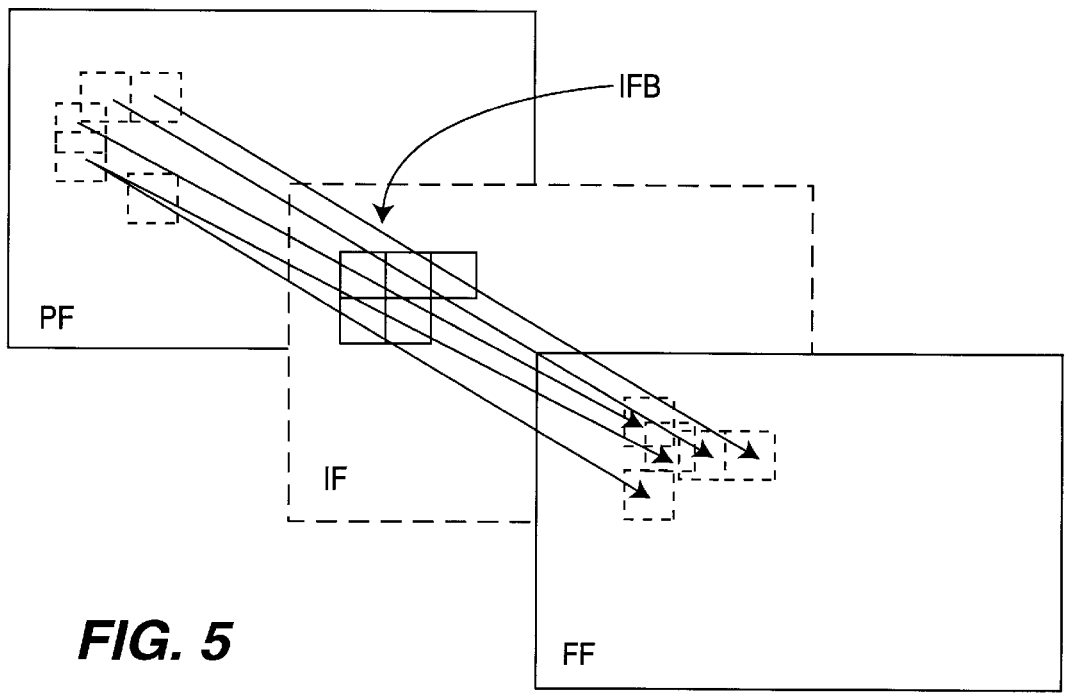

Two-sided block matching solves the positional error problem because the current blocks IFB cover the interpolated field and are correctly placed in the interpolated field, and it solves the problem of gaps and conflicts because every point in the interpolated field has precisely one motion vector assigned to it, see FIG. 5.

One problem with two-sided block matching is that, for a given motion vector accuracy, pixel coordinates need to be expressed twice as accurately as for one-sided block matching. This is particularly difficult if the motion vectors are required to integer accuracy, because the forward-and backward-pointing halves of the motion vector will then be expressed to the nearest half-integer. This problem can be overcome either (i) by interpolating the field to provide the half-pixel points (for which simple bilinear interpolation will suffice) or (ii) by rounding the forward and backward half-vectors in such a way that their sum remains correct.

Figure 6:
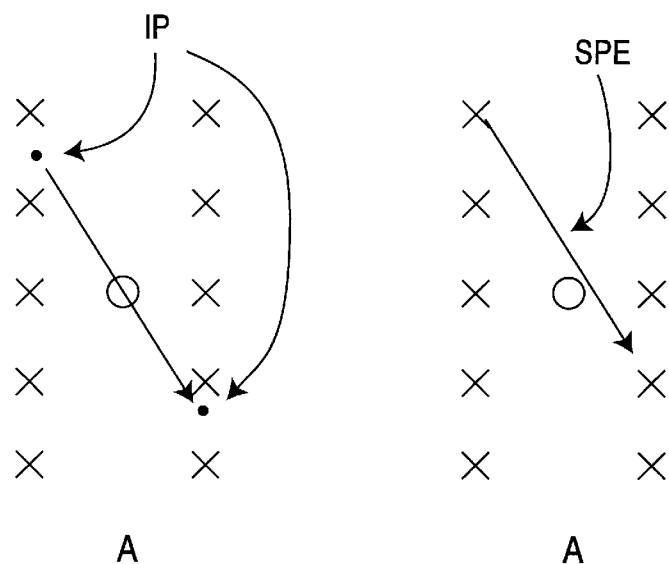

Method (i) involves an increase in hardware complexity, while method (ii) avoids the need for half-pixel interpolation but re-introduces a slight positional error (i.e. the vector is not calculated at the exact position, but because the present vector position is very near to the required one the direction of the ideal vector will be very similar to the direction of the calculated one) of up to half a pixel in the information used to estimate the motion vectors, an error which has been shown to have negligible effect on the final picture quality. These two methods are illustrated (for one dimension only) in FIG. 6. FIG. 6A depicts the two-sided case with interpolated pixels IP for method (i) and FIG. 6B the two-sided case with slight positional error SPE (maximum case) for method (ii).

In principle, the inventive method is suited for motion estimation using block matching within a preselected search window width, wherein each successive pixel block of a current field or frame is matched with respective candidate pixel blocks within a search window of a backward field or frame having a half of said preselected width and with the corresponding pixel blocks within the corresponding search window of a forward field or frame having a half of said preselected width in order to select a motion vector related to the location of the best matching block of the backward field or frame and to the location of the best matching block of the forward field or frame, whereby the current position of said search window is related to the position of the current pixel block of said current field or frame.

In principle the inventive apparatus is suited for motion estimation using block matching within a preselected search window width and includes:

field or frame delay means and line delay means and sample delay means providing for each successive pixel block of a current field or frame the pixel positions of a search window of a backward field or frame having a half of said preselected width and the pixel positions of the corresponding search window of a forward field or frame having a half of said preselected width;

processing elements arranged in respective order with said delay means, for matching each of said successive pixel blocks of a current field or frame with the corresponding candidate pixel blocks within said search windows by accumulating the errors between such pixels which arrive at its two inputs, storing partial results in order to arrive at a total error for each block;

detection means connected to said processing means for selecting a motion vector related to the location of the best matching pair of forward and backward blocks, a first part of which is related to the backward field or frame and a second part of which is related to the forward field or frame, whereby the current position of said search windows is related to the position of the current pixel block of said current field or frame.

DRAWINGS

Figure 2:
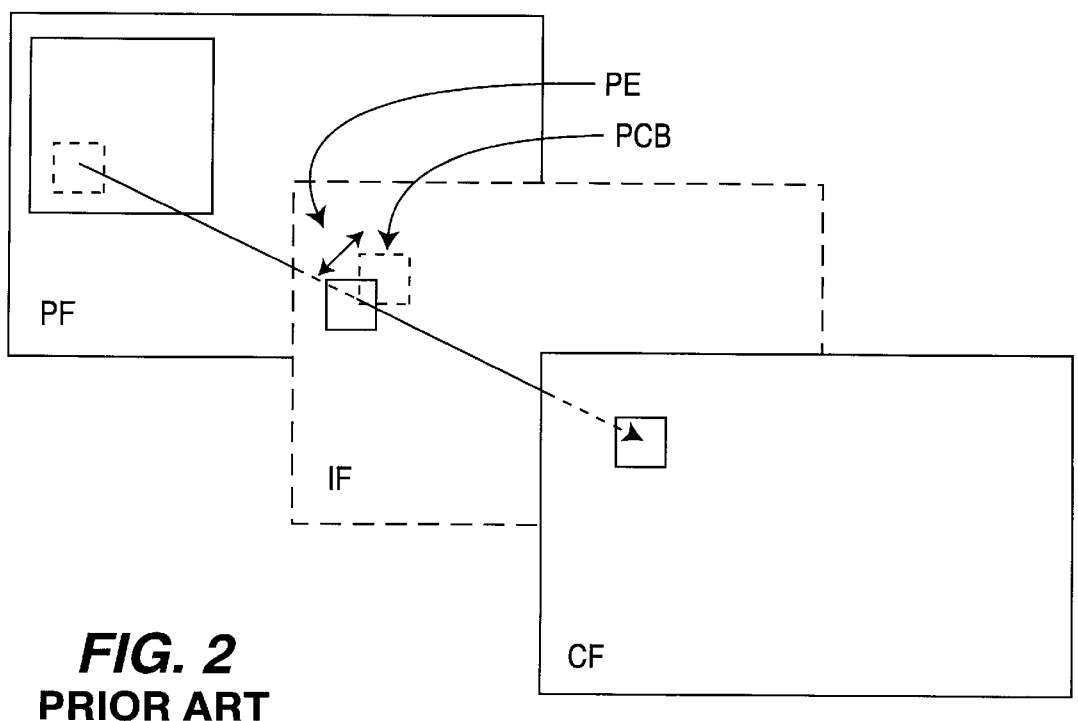
Figure 4:
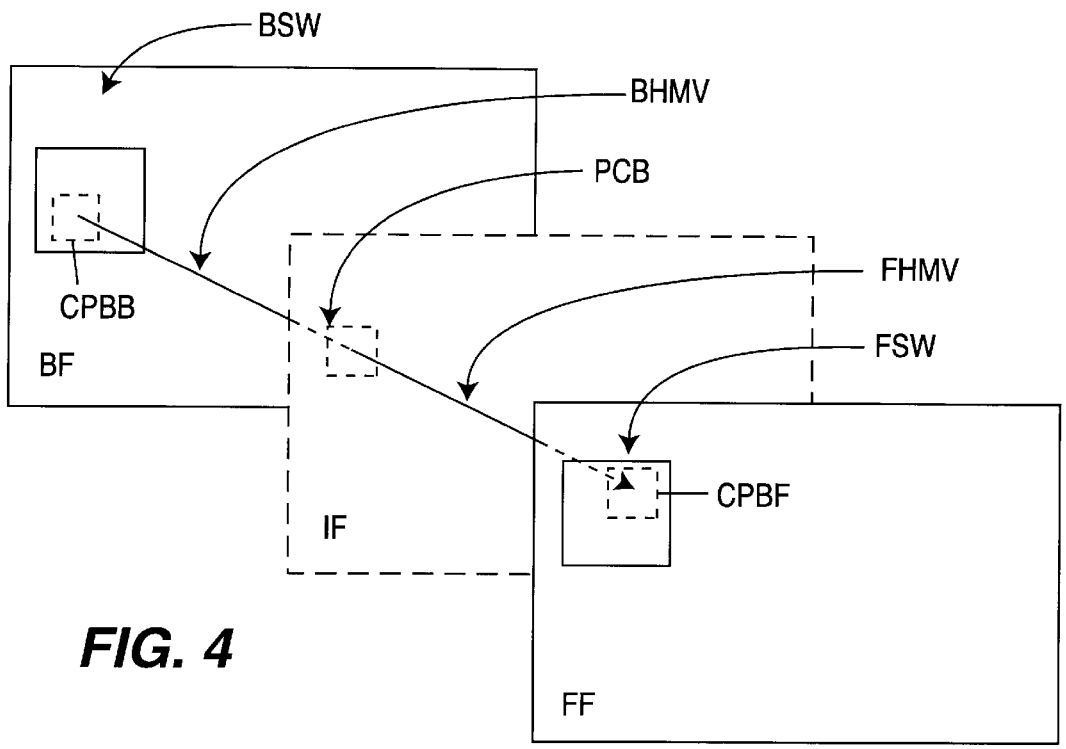
Figure 8:
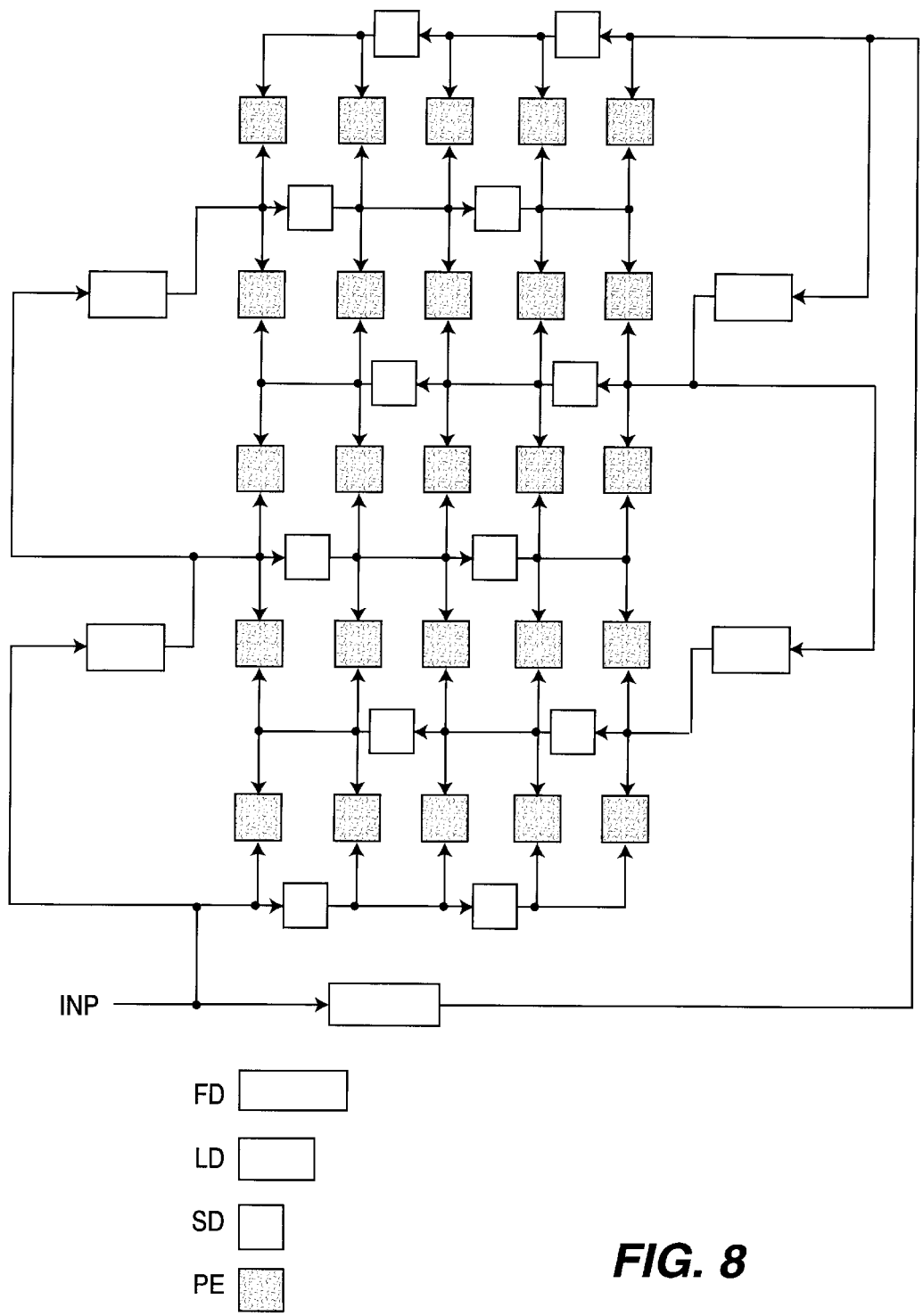

Preferred embodiments of the invention are described with reference to the accompanying drawings, which show in:

FIG. 1 one-sided block matching;

FIG. 2 positional error in one-sided block matching;

FIG. 3 motion vector gaps and conflicts in one-sided block matching;

FIG. 4 two-sided block matching;

FIG. 5 avoidance of gaps and conflicts in two-sided block matching;

FIG. 6 overcoming the accuracy problem;

FIG. 7 one architecture for one-sided block matching;

FIG. 8 one architecture for two-sided block matching.

PREFERRED EMBODIMENTS

FIG. 8 shows a possible architecture for a two-sided block matching motion estimator with a range of ±2 pixels per field horizontally and vertically, to integer accuracy. This architecture is based on processing elements, one per candidate motion vector. Each processing element PE accumulates the errors between the pixels (which form a group related to a candidate block position and vector, respectively) arriving at its two inputs, storing partial results in order to arrive at a total error for each block. The processing elements are connected together by means not shown in the figure in order to find which one yields the minimum error for each block.

The processing elements may calculate the minimum absolute value or the minimum squared error.

The two-sided motion estimator in FIG. 8 uses method (ii) described above to overcome the accuracy problem. The line LD and SD sample delays used to generate the relative search window displacements are now shared between the two fields, and both inputs of each processing element PE depend on the motion vector being tested, whereby the one input includes the field delay FD connected to input INP.

Advantageously, with the architecture described, the two-sided implementation is actually slightly simpler than the one-sided of FIG. 7.

The inventive motion compensation improves the subjective picture quality and can also be used in slow motion generation, noise reduction, standard conversion and for controlling LCD displays.

We claim:

1. Apparatus for motion estimation using two-sided block matching wherein a current field or frame to be interpolated and which is non-existing in an original picture signal is regarded as having notional pixel blocks which cover the field or frame to be interpolated and are correctly placed in that field or frame to be interpolated, comprising:

field or frame delay means, line delay means and sample delay means for providing for each current of said notional pixel blocks pixels of the required pixel positions of a forward search window, having a preselected width, of a forward field or frame, further field or frame delay means, line delay means and sample delay means for providing for the current of said notional pixel blocks, the pixels of the required pixel positions of a backward search window, having said preselected width of a backward field or frame;

processing elements each having two inputs and being connected to said field or frame delay means, line delay means and sample delay means and/or to said further field or frame delay means, line delay means and sample delay means for matching respective forward candidate pixel blocks within the forward search window in the forward field or frame with respective backward candidate pixel blocks within the backward search window in the backward field or frame by accumulating the errors between such pixels which arrive at its two inputs, and means for storing the partial results in order to arrive at a total error for each block;

detection means connected to said processing elements for selecting a motion vector related to the location of the best matching pair of blocks from the forward field or frame and the backward field or frame, in order to select one motion vector for the current of said notional pixel blocks (I FB), whereby a first half of said motion vector points to the location of the best matching block in the backward field or frame search window and the second half of said motion vector points to the location of the best matching block in the forward field or frame search window, both vector parts depending on a same candidate motion vector, wherein the candidate motion vector all pass through the same points in said current field or frame to be interpolated, and wherein every point in the interpolated field has precisely one motion vector assigned thereto to eliminate motion vector gaps and conflicts within areas in the interpolate field.

2. Apparatus according to claim 1, wherein said selection means round the first half and the second half of said motion vector in such a way that a related sum remains correct.

3. Method for motion estimation using two-sided block matching wherein a current field or frame to be interpolated and which is non-existing in an original picture signal is regarded as having notional pixel blocks which cover the field or frame to be interpolated and are correctly placed in that field or frame to be interpolated and wherein respective forward candidate pixel blocks within a forward search window in a forward field or frame are matched with respective backward candidate pixel blocks within a backward search window in a backward field or frame in order to select one motion vector for a current of said notional pixel blocks comprising the step of:

the two sided block matching is performed so that a first part of said motion vector for a current of said notional pixel blocks points to the location of the best matching block out of the backward field or frame search window and the other part of said motion vector points to the location of the best matching block out of the forward field or frame search window, both vector parts depending on a same candidate motion vector, wherein the candidate motion vectors all pass through the same points in said current field or frame to be interpolated, and wherein every point in the interpolated field has precisely one motion vector assigned thereto to eliminate motion vector gaps and conflicts within areas in the interpolated field.

4. Method according to claim 3, wherein the first part and the other part of said motion vector are each one half of the motion vector.

5. Method according to claim 4, wherein the first half and the second half of said motion vector are rounded in such a way that a related sum remains correct.

6. Method according to claim 3, wherein said block matching in said backward and said forward field or frame is performed using interpolated half-pixel values.

7. Method according to claim 3, wherein this method is used for field or frame rate upconversion, slow motion generation, noise reduction or for controlling displays.

* * * * *